United States Patent
Wu et al.

(10) Patent No.: US 8,238,908 B2
(45) Date of Patent: Aug. 7, 2012

(54) METHOD AND SYSTEM FOR NETWORK LOGOUT FOR A MOBILE STATION IN IDLE MODE

(75) Inventors: Jianjun Wu, Shenzhen (CN); Yong Xie, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 821 days.

(21) Appl. No.: 12/273,268

(22) Filed: Nov. 18, 2008

(65) Prior Publication Data

US 2009/0092045 A1    Apr. 9, 2009

Related U.S. Application Data

(63) Continuation of application No. PCT/CN2007/070034, filed on May 18, 2007.

(30) Foreign Application Priority Data

May 18, 2006  (CN) .......................... 2006 1 0082602

(51) Int. Cl.
*H04W 4/00* (2009.01)
(52) U.S. Cl. .................. 455/435.1; 455/452.2; 455/412; 455/11.1; 370/331; 370/311
(58) Field of Classification Search ................ 455/435.1, 455/11.1, 452.2; 370/312
See application file for complete search history.

(56) References Cited

U.S. PATENT DOCUMENTS

| 5,857,144 | A * | 1/1999 | Mangum et al. ............. 455/11.1 |
| 5,913,166 | A | 6/1999 | Buttitta et al. |
| 6,654,360 | B1 | 11/2003 | Abrol |
| 2005/0007971 | A1 * | 1/2005 | Jeong et al. .................... 370/312 |
| 2005/0192021 | A1 * | 9/2005 | Lee et al. .................... 455/452.2 |
| 2006/0109825 | A1 * | 5/2006 | Abdel-Kader et al. ....... 370/338 |
| 2008/0063158 | A1 * | 3/2008 | Gallant ....................... 379/88.22 |

FOREIGN PATENT DOCUMENTS

| CN | 1423910 A | 6/2003 |
| CN | 1549619 A | 11/2004 |

(Continued)

OTHER PUBLICATIONS

IEEE 802.16 Working Group; "IEEE 802.16e Air Interface for Fixed and Mobile Broadband Wireless Access Systems; Amendment 2 and Corrigendum 1"; [Online]; Feb. 28, 2006; IEEE; USA; XP002544146; ISBN: 0-7381-4857-1; Retrieved from the Internet: URL:http://standards.ieee.org/getieee802/download/802.16e-2005.pdf>; [retrieved on Sep. 2, 2009].

(Continued)

*Primary Examiner* — Nick Corsaro
*Assistant Examiner* — Isaak R Jama
(74) *Attorney, Agent, or Firm* — Huawei Technologies Co., Ltd.

(57) ABSTRACT

A method for network logout for a mobile station (MS) in IDLE mode. The method includes performing network logout upon the MS by a network side, releasing the resources associated with the MS and deleting the context of the MS. A system for network logout for a mobile station in IDLE mode. MS location update procedures, conducted by the network side, in various situations enables the paging controller or other network entity to delete the context of the MS and also provides network logout processing in the scenarios when the network resources are in congestion, the location update of the network side times out and the network side varies with the service policy.

17 Claims, 5 Drawing Sheets

FOREIGN PATENT DOCUMENTS

| | | |
|---|---|---|
| CN | 1549640 A | 11/2004 |
| CN | 1567757 A | 1/2005 |
| EP | 1596616 A1 | 11/2005 |

OTHER PUBLICATIONS

WiMAX Forum; "WiMAX End-to-End Network Systems Architecture—(Stage 2: Architecture Tenents, Reference Model and Reference Points)—Dec. 15, 2005 Draft"; WiMAX Forum; XX, XX; pp. 1-242; XP002442962.

European Search Report for European Patent Application No. 07721657.0, dated Sep. 14, 2009.

Chinese Office Action for Chinese Patent Application No. 200610082602.1, dated Apr. 13, 2010, and partial English translation thereof.

English translation of Written Opinion of the International Searching Authority for International Application No. PCT/CN2007/070034, dated Aug. 30, 2007.

International Search Report for International Application No. PCT/CN2007/070034, dated Aug. 30, 2007, and English translation thereof.

Corresponding granted Chinese Patent No. 101043741 B (Application No. 200610082602.1) citing prior art at Item (56), issued Feb. 2, 2011, 1 page only.

WiMAX Forum Proprietary: WiMAX End-to-End Network Systems Architecture, Stage 3: Detailed Protocols and Procedures,© 2005, 2006 WiMAX Forum, dated Apr. 10, 2006,total 241 pages.

IEEE C802.16e-04/430r2: "IEEE 802.16 Broadband Wireless Access Working Group, Enhancements to the Message Transfers for the initialization of Scan, Sleep, and Idle Mode", dated Nov. 4, 2004,total 9 pages.

* cited by examiner

METHOD AND SYSTEM FOR NETWORK LOGOUT FOR A MOBILE STATION IN IDLE MODE

CROSS-REFERENCE TO RELATED APPLICATIONS

This application is a continuation of International Application No. PCT/CN2007/070034, filed May 18, 2007. This application claims the benefit and priority of Chinese Application No. 200610082602.1, filed May 18, 2006. The entire disclosures of each of the above applications are incorporated herein by reference.

FIELD

The present disclosure relates to wireless access technology, more specifically to method and system for network logout for a mobile station in idle mode.

BACKGROUND

This section provides background information related to the present disclosure which is not necessarily prior art.

IDLE mode is a work mode for a mobile station with regard to the mobile broadband wireless access system defined by IEEE 802.16e. In IDLE mode, a mobile station (MS) may move in a wide area, receiving downlink broadcasting service information at regular intervals. A base station (BS) informs the MS of the delivery of the downstream service by broadcasting a message. The MS, when roaming within this area, does not have to register with the BS at the cell where the MS roams. In addition, the MS does not have to perform normal operations such as handoff when roaming into a different cell. Advantageously, the MS power and the resources of air interfaces may be saved.

A plurality of BS may constitute a group, called a Paging Group (PG). The goal of the paging group is to form a continuous area in which the MS does not need to send upstream service but may decide, through downstream paging channel, whether there is any downstream service sent to the MS. The paging group must be large enough to ensure that most mobile stations are retained in the same paging group within a relatively long time period. Moreover, the paging group must be small enough to ensure a reasonable overhead for paging MS in a paging group.

During normal operations with a certain serving BS, the MS may send a message requesting for entering the IDLE mode. Similarly, the Serving BS may also send a message, actively requiring the MS to enter the IDLE mode. No matter it is the MS that actively requests to enter the IDLE mode, or it is the Serving BS that actively requires the MS to enter the IDLE mode, MS has to complete registration and enter the IDLE mode in a prescribed time period.

The current World Interoperability for Microwave Access (WiMAX) under enactment defines a paging reference model in IDLE mode. In the paging reference model illustrated in FIG. 1, the Access Service Network Gateway (ASN_GW) does not take other physical net elements and logic entities in the WiMAX network which are irrelevant to paging procedure into consideration. The WiMAX paging reference model is illustrated in FIG. 1 in the subsequent detailed description.

According to the paging reference model in FIG. 1, when MS actively send request to BS1 (Serving BS) for entering the IDLE mode, or the BS1 instructs the MS to enter the IDLE mode, the exchange of information between MS and BS1, between BS1 and the back end net element, ASN_GW, may help to inform a paging controller (also known as an anchor paging controller, implemented in the ASN GW1) that the MS has entered the IDLE mode and the paging controller may save the status information, paging information as well as service flow information of the MS in a corresponding location register (LR). The MS may carry information which the MS requests to preserve when it is entering the IDLE mode in the IDLE request message sent to the BS1. The BS1 may also configure similar information in a response to the IDLE request message so as to inform the MS of the related information preserved in the LR and inform the MS of the paging controller ID. Moreover, after the MS enters the IDLE mode, R4, R6 interfaces need to be released whereas the R3 interface between the home agent (HA) and foreign agent (FA) needs to be preserved.

Scenarios that the MS updates its location are described below.

(1) Paging Group update, referring to location update in that the paging group changes. When the current paging group broadcast by the BS, received by the MS, is inconsistent with the paging group which was assigned to the MS, location update needs to be performed and new paging group as well as new paging parameters need to be assigned.

(2) Timer update, referring to location update in that the timer times out. After the MS enters the IDLE mode, both the network side and the MS will initiate a timer for IDLE mode management. The MS will perform location update before the timer times out.

(3) Power off update, referring to location update when the MS powers off in IDLE mode. In IDLE mode, if the MS powers off, location update may also need to be performed with the network side. In the prior art, the location update in the case of power off is just a normal location update, which does not delete the MS context preserved in the network entity.

(4) MAC Hash Skip Threshold update: location update caused by exceeding MAC Hash Skip Threshold.

The prior art simply describes the location update procedure in normal situations, or the location update procedure in the instance where the paging group changes. However, the prior art fails to consider the location update procedure in exceptional cases (e.g., network logout as a result of power off and congestion of the network, etc.). One approach to addressing this problem and one way to handle the location update procedure in the exceptional cases differs from location update procedure in the instance where the paging group changes according to the prior art.

SUMMARY

This section provides a general summary of the disclosure, and is not a comprehensive disclosure of its full scope or all of its features.

In view of the foregoing issues, various embodiments provide methods of network logout for an MS in IDLE mode so as to offer a solution to network logout in various situations for MS in IDLE mode.

The method for network logout for an MS in IDLE mode includes the following processes.

The network side performs network logout upon the MS, releases resources associated with the MS and deletes the context of the MS.

The embodiments further propose a system for network logout for an MS in IDLE mode. The system includes a paging controller/location register and a network entity saving the context of the MS.

The paging controller/location register may perform location update upon the MS in IDLE mode which needs to logout a network, and may trigger the network entity saving the context of the MS to delete the context of the MS.

Advantageously, methods for network logout for the MS in IDLE mode according to the present disclosure provide location update procedures in various situations and enable the paging controller or other network entity to delete the context of the MS after location update is done, and timely release the resources that the network side uses to configure the MS. Accordingly, the system resources are saved.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
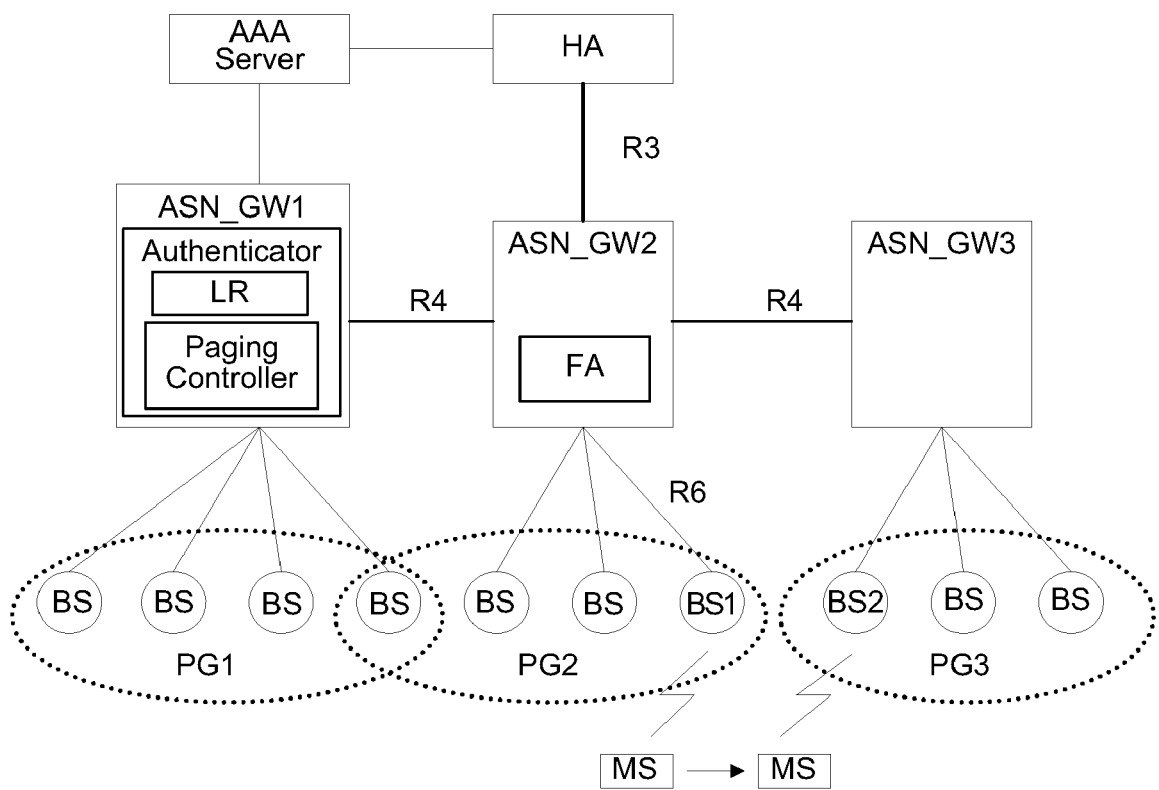
FIG. 1 is a prior art paging reference model for the existing WiMAX system.

Example embodiments will now be described more fully with reference to the accompanying drawings.

Reference throughout this specification to "one embodiment," "an embodiment," "specific embodiment," or the like in the singular or plural means that one or more particular features, structures, or characteristics described in connection with an embodiment is included in at least one embodiment of the present disclosure. Thus, the appearances of the phrases "in one embodiment" or "in an embodiment," "in a specific embodiment," or the like in the singular or plural in various places throughout this specification are not necessarily all referring to the same embodiment. Furthermore, the particular features, structures, or characteristics may be combined in any suitable manner in one or more embodiments.

To present the goal, technical solutions and advantages concerning the embodiments more clearly, detailed description is made below to the embodiments in conjunction with the accompanying drawings.

Embodiments provide methods for network logout in various situations for an MS in idle mode so that the resources used by a network side to configure the MS is timely released. The various situations includes, but not limited to, MS power-off, location update timeout, resource congestion of the network side or variation of the network side based on service policy.

A paging controller is a network entity controlling the MS activity in IDLE mode. This entity is a logic entity concerning the current WiMAX network architecture and closely relates to another logic entity, authenticator (the paging controller might serve as a part of logic functions in the Authenticator and be implemented in the same physical net element). The physical location of the paging controller might be located in a physical net element, Access Service Network Gateway (ASN_GW), in the WiMAX network, and might also be located in another separate physical net element. For ease of description, the paging controller, i.e., the logic entity, or the Access Service Network Gateway, i.e., the physical entity where the paging controller might be located, may be abbreviated as paging controller (PC)/Access Service Network Gateway (ASN_GW).

Moreover, since the paging controller needs to initiate a paging message according to the paging group where the current MS is located, there is a need for a location register (LR) to save the status information, paging information and service flow related information of the MS. In general, a PC logic entity may correspond to an LR logic entity. These two logic entities may be implemented in a same physical net element. These two logic entities which corresponds to each other may be abbreviated as paging controller (PC)/location register (LR).

A paging agent is a logic entity which may be located in a physical net element, e.g., base station, or may be located in a separate physical net element. For ease of description, the paging agent or the base station where the paging agent is located may be abbreviated as paging agent/serving base station.

For example, when the terminal powers off, network logout in the IDLE mode may be implemented according to the procedure presented by the present disclosure.

a. The MS sends to the paging agent or the serving base station where the paging agent is located (hereinafter paging agent/serving base station) a search request message with power-off indication so as to initiate location update;

b. The paging agent/serving base station verifies the location update request message according to an authentication key and authentication key context of the MS. Two situations may occur. One is that the paging agent/serving base station has saved a valid authentication key (AK) and AK context of the MS. The other is that the paging agent/serving base station has not saved a valid authentication key (AK) and AK context of the MS. If having not been saved, then, key information must be obtained to verify the validity of the search information.

c. If the verification is valid, paging agent/serving base station performs location update and transmits a location update confirmation message to an anchor paging controller/location register.

d. If the location update is confirmed successfully, the anchor paging controller/location register deletes the context of the MS.

Detailed illustration of a plurality of embodiments are made to the schemes for MS logout in various situations.

Embodiment One

Figure 2:
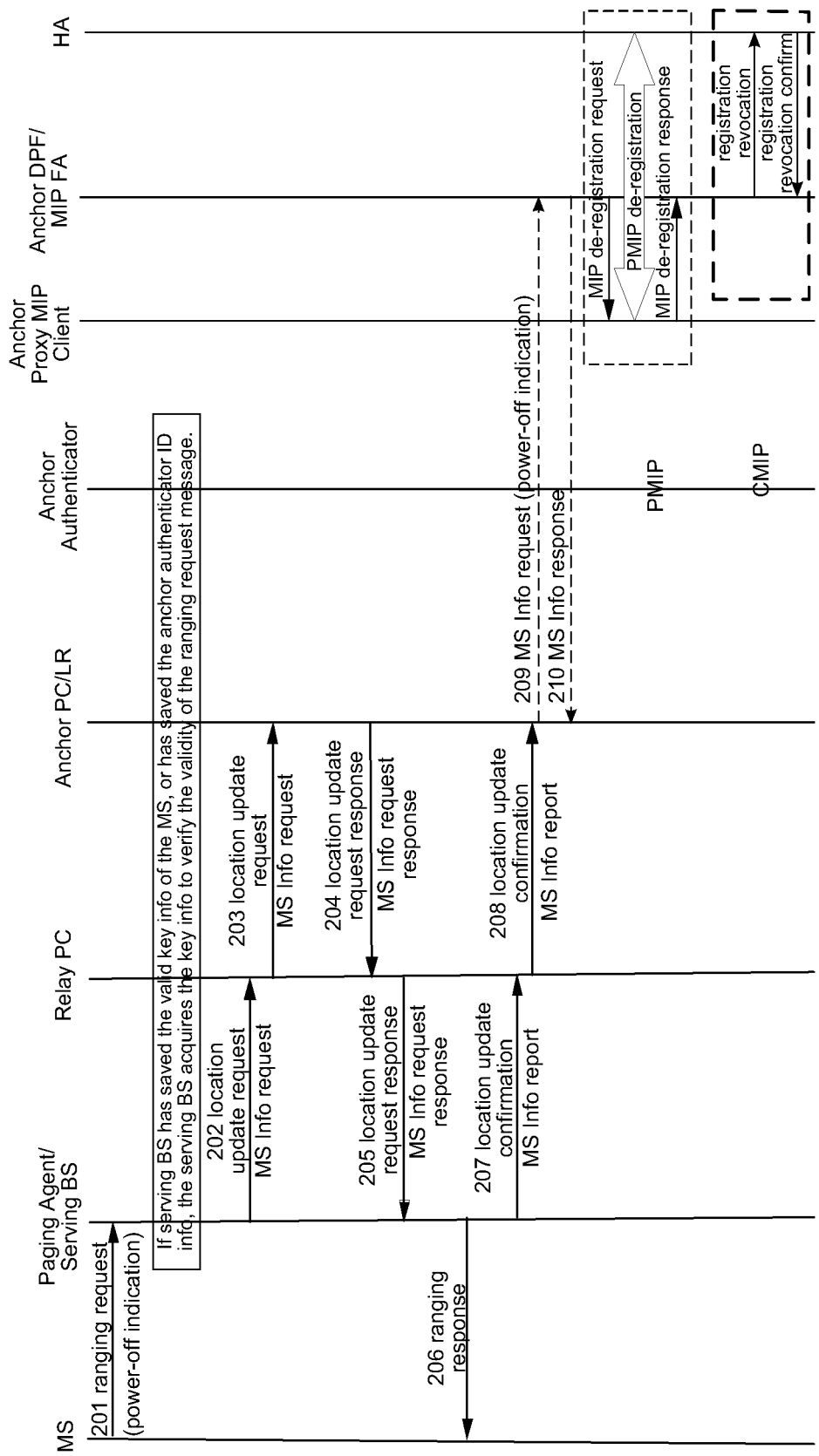
FIG. 2 is flowchart of MS logout according to a first embodiment.

FIG. 2 is a flowchart of MS logout according to the first embodiment. If the paging agent/serving base station has saved the valid authentication key (AK) and AK context of the MS, the process of network logout according to the present disclosure are presented as follows.

At 201, the MS initiates location update via a ranging request (RNG_REQ) message which carries MS ID, anchor paging controller ID and power-off indication. The power-off indication indicates that the current MS in IDLE mode attempts to power off.

At 202, after receiving the search request message (RNG_REG), the paging agent/serving base station verifies the validity of the search request message (RNG_REG) according to the valid authorization key (AK) and AK context it saved.

I. If invalid, the paging agent/serving base station sends a ranging response (RNG_RSP) message carries indication of unsecured location update, indicating location update failure. The message directs the MS to conduct a re-access procedure, terminates the location update procedure and retains the information relating to the MS saved by all the entities in the network side.

II. If valid, the paging agent/serving base station sends a location update request (LU_REQ) message to the Serving Access Service Network Gateway (Serving ASN_GW) which then forwards the location update request message to a relay paging controller (relay PC) (may also be located in the ASN_GW). The location update request message may carry MS ID, BS ID, anchor paging controller ID and power-off indication as well as indication of verification completion.

At 203, the relay paging controller may forward the location update request message to the anchor paging controller (which may be located in a ASN_GW which might be different from the one where the relay paging controller is located.) and may add a cell carrying relay paging controller indicator in the forwarded message.

At 204, after receiving the location update request message, the anchor paging controller performs location update and logs the ID information of the relay paging controller where the MS is located and makes a reply of a location update response (LU_RSP) message to the ASN_GW where the relay paging controller is located. Since the location update request message indicates the completion of the verification, the LU_RSP message may just carry the MS ID and Transaction ID.

At 205, the relay paging controller forwards the LU_RSP message to the paging agent/serving base station.

At 206, after receiving the LU_RSP, the paging agent/serving base station makes a reply of a search response (RNG_RSP) message to the MS, indicating successfulness of the location update.

At 207, the paging agent/serving base station makes a reply of a location update confirmation (LU_Confirm) message to the relay paging controller. The message carries indication of the success or failure of the location update.

At 208, after receiving the location update confirmation message, the relay paging controller further makes a reply of a LU_Confirm message to the anchor paging controller. The message contains power-off indication.

After the anchor paging controller receives the LU_Confirm message forwarded from the relay paging controller, and if the location update is confirmed as successful and contains power-off indication, the anchor paging controller, including its associated location register, may delete the context of the MS it preserved and all parameters preserved for the MS in IDLE mode. If the location update fails, the context of the MS will not be deleted.

According to one embodiment, 203-206 are optional, which means that after the verification of the search request message, the paging agent may send update confirmation request (or MS information request) directly to the anchor paging controller via the relay paging controller so that the anchor paging controller may perform location update and delete the context of the MS.

After 208, the process according to the embodiment may further includes the following.

At 209, the anchor paging controller sends the MS information request (MS Info Request) message to the Anchor Data Path Function entity or Foreign Agent (anchor data path function/FA). The MS information request message carries power-off indication.

At 210, after receiving this message, the anchor data path function (DPF)/FA will delete the maintained context of the MS and, at the meantime, make a reply of the MS Info Response message to the anchor paging controller, indicating a successful deletion.

The process according to the embodiment may further include the following.

The FA, at the same time, sends a Delete MS Context Indication message carrying the MS ID and informs an anchor service flow authorization (anchor SFA) function entity and an anchor authenticator to which the MS corresponds. The anchor SFA and the anchor authenticator respond to this message and delete all the context corresponding to the MS.

Further, the anchor authenticator may also inform an anchor accounting client of the MS to stop accounting for the MS and inform the Authentication Authorization Accounting server (AAA) server to acquire the information regarding the network logout of the MS. The AAA server performs network logout upon the MS and deletes context associated with the MS.

The process according to the embodiment further includes the followings.

For proxy mobile IP (PMIP) MS, the FA (the mobile IP foreign agent at this point), at the same time, informs the Anchor PMIP Client to initiate a de-registration procedure for the mobile IP (MIP).

For client mobile IP (CMIP), since the MIP client is on the MS and there is no data path which may carry MIP registration signaling between the MS and FA at present, the FA may send a Registration Revocation message to the HA to perform the MIP de-registration procedure. Meanwhile, the HA responds to the Registration Revocation message to the FA to complete the de-registration procedure for MIP.

The de-registration procedure for PMIP may also be similar to that for CMIP.

Alternatively, anchor paging controller/location register may inform the anchor service flow authorizer, anchor authenticator and anchor proxy mobile IP client to delete the context of the MS.

The MS anchor flow authorizer may further inform a policy server of MS logout and may carry MS ID, logout indicator, logout reasons or any combination thereof.

The policy server deletes the context of the MS that it maintains according to the received notification message, and may log the logout reasons at the same time.

If the AAA server has preserved the AK context of the MS, the MS anchor authenticator may further inform the AAA server of MS logout and may carry MS ID, logout indicator, logout reasons or any combination thereof.

The AAA server deletes the context of the MS that it maintains according to the received notification message, and may log the reasons for network logout at the same time.

The embodiment may further include requesting an IP address allocation entity to release the IP address of the MS.

Since there are various approaches for allocating the IP addresses, different allocation approach may have a different procedure for releasing the IP address. Therefore, in the process of network logout of the MS, the procedure for releasing IP address to be performed may vary with the allocation approach as well.

For instance, for the dynamically allocated IP address, the FA may inform a dynamic host configuration protocol (DHCP) proxy to initiate a process for releasing IP address. The DHCP proxy sends a DHCP Release Request message to the DHCP server. Alternatively, the anchor paging controller/location register may inform the DHCP proxy to send the DHCP Release Request to the DHCP server so as to release the dynamic IP address.

With respect to the approach of assigning IP address in the authentication procedure, IP addresses may be released during the exchange between the authenticator and the AAA server occurs when the MS is logging out the network; alternatively, with respect to the approach of acquiring IP addresses during MIP registration procedure, the IP addresses may be released during de-registration procedure for the MIP when the MS is logging out the network.

The foregoing completes the logout process for the MS in IDLE mode.

Embodiment Two

Figure 3:
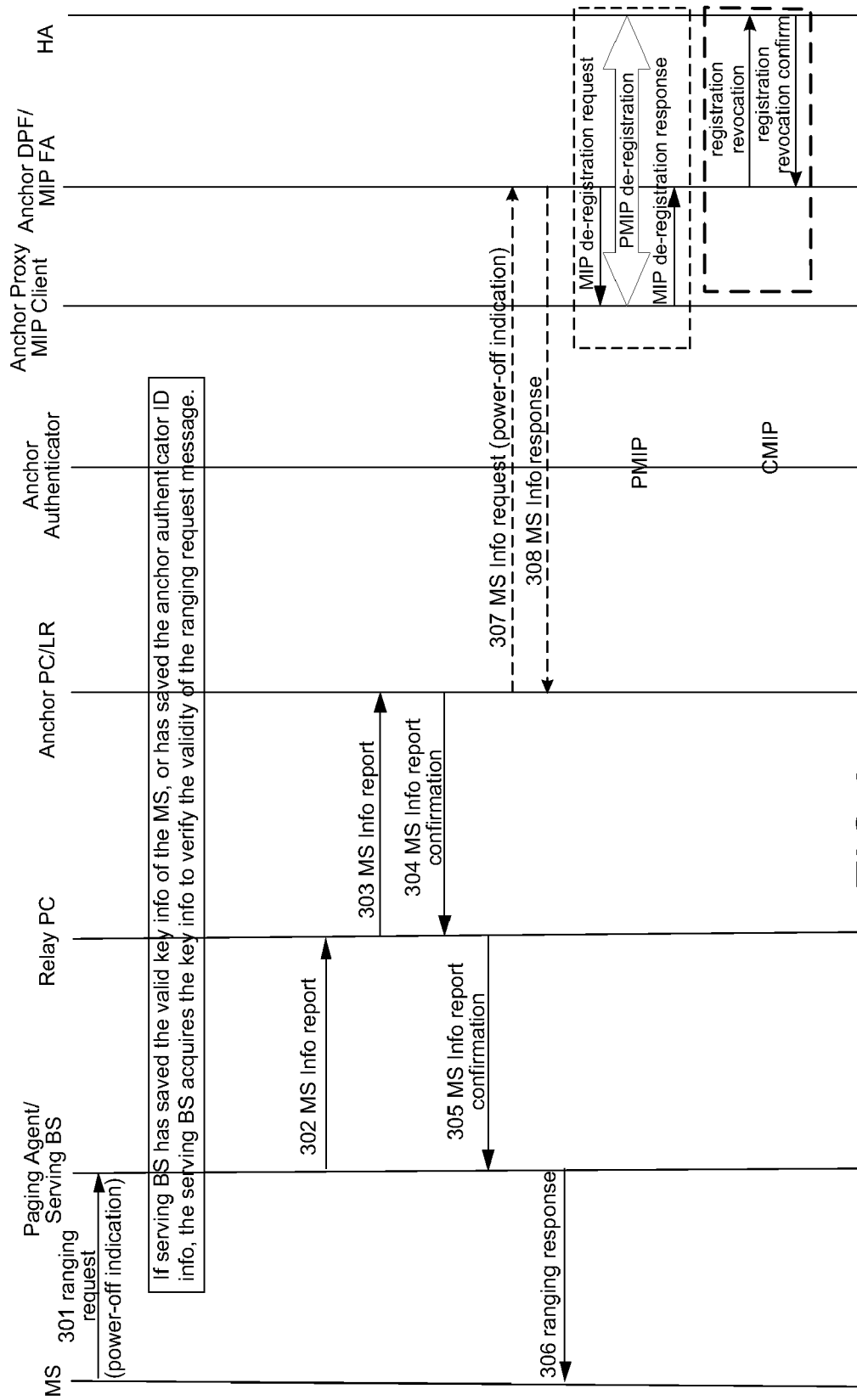
FIG. 3 is flowchart of MS logout according to a second embodiment.

FIG. 3 illustrates a flowchart of network logout according to the embodiment. After the paging agent/serving base station completes the verification of the search request message, 302 and 303 may transmit an MS information report to the anchor paging controller/location register directly or via the relay paging controller. The anchor paging controller/location register directly performs location update, deletes the context of the MS and transmits, at the same time, the MS an information report confirmation to the paging agent via 304 and 305. At 306, the paging agent/serving base station returns a search response to the MS. At 307 and its subsequent procedures are similar to 209 and its subsequent procedures, which is omitted herein for clarity.

Embodiment Three

Figure 4:
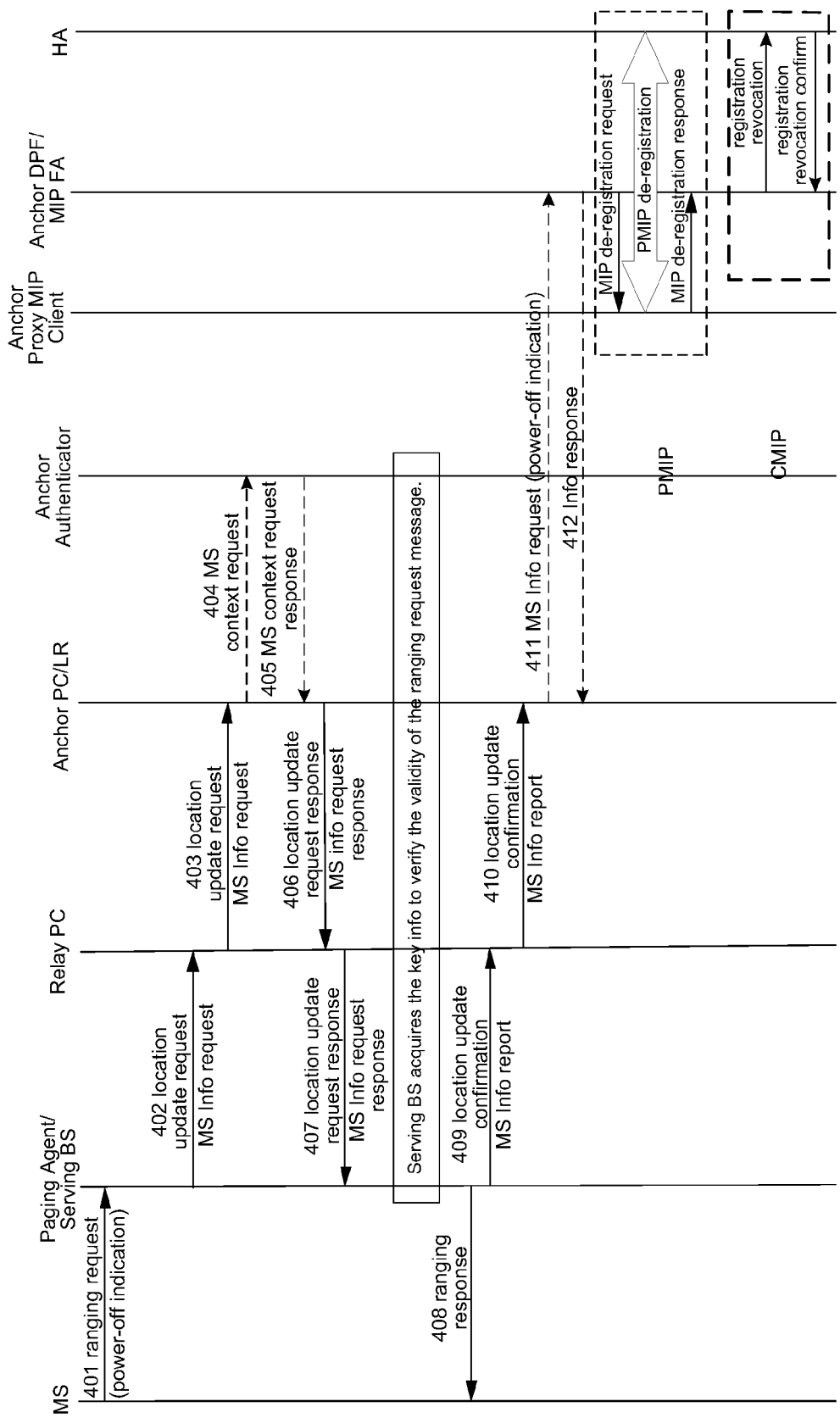
FIG. 4 is flowchart of MS logout according to a third embodiment.

According to the present embodiment, the paging agent/serving base station has not saved the valid authentication key (AK) and AK context of the MS. As illustrated in FIG. 4, the network logout method according to the embodiment includes the following procedures.

At 401, the MS initiates a location update via a search request (RNG_REG) message which carries MS ID, Anchor Paging Controller ID and power-off indication. The power-off indication indicates that the MS in current IDLE mode attempts to power off.

At 402, after the paging agent/serving base station receives the location update (RNG_REG) message of the MS, it is necessary to acquire the key information to verify the validity of the RNG_REG message since the paging agent/serving base station has not saved the valid authentication key (AK) and AK context of the MS. If the paging agent/serving base station does not know the Anchor Authenticator ID information of the MS, the paging agent/serving base station sends a location update request (LU_REQ) message to the serving ASN_GW which then forwards the LU_REQ message to an ASN_GW where the relay paging controller is located. The message may carry MS ID, BS ID, anchor paging controller ID, power-off indication and indication of a need for MS security information.

At 403, the relay paging controller forwards the location update request message to the ASN_GW where the anchor paging controller is located and adds a cell carrying relay paging controller ID in the forwarded message.

After receiving the location update request message, the anchor paging controller logs the ID information of the relay paging controller where the MS is located, and performs location update. If the location update request message indicates the need for security information, the anchor paging controller will find the anchor authenticator ID information of the MS in the anchor location register associated with the anchor paging controller.

At 406, the anchor paging controller may make a reply of a location update response (LU_RSP) message to the relay paging controller. The message may carry MS ID, anchor paging controller ID, relay paging controller ID, BS ID and anchor authenticator ID information.

At 407, the relay paging controller forwards the LU_RSP message to the paging agent/serving base station.

After the paging agent/serving base station receives the LU_RSP message, and if the LU_RSP message carries the anchor authenticator ID information, the serving BS may send a key request (AK_Request) message to the ASN_GW where the anchor authenticator is located, requesting to generate the AK and AK context. The anchor authenticator returns the AK and AK context to the paging agent/serving base station via a key transfer(AK_Transfer) message. The paging agent/serving base station verifies the RNG_REQ message after receiving the AK and AK context.

At 408, if the verification is successful, a search response (RNG_RSP) message is replied to the MS, indicating the success of the location update. If the verification fails, a failure indicator will be contained in the RNG_RSP message and MS will be directed to perform a network re-access procedure, where the procedure of directing the MS to re-access the network is optional.

After 403 of the embodiment, 404 and 405 may also be performed, as illustrated in FIG. 4. That is, the anchor paging controller directly informs the anchor authenticator to generate a new AK and AK context for the MS. Then, at 406, the LU_RSP message replied to the relay paging controller by the anchor paging controller may directly carry the generated AK and AK context, rather than carry the authenticator ID.

At 409, the paging agent/serving base station makes a reply of the location update confirmation (LU_Confirm) message to the relay paging controller. The message carries an indication if the success or failure of the location update.

At 410, after receiving the LU_Confirm message, the relay paging controller further responds to the LU_Confirm message to the anchor paging controller. The message contains a power-off indication.

At 411 and its subsequent procedures of this embodiment are similar to 209 and its subsequent procedures of the first embodiment, which is omitted herein for clarity.

In the 402 of this embodiment, if the paging agent/serving base station stores the anchor authenticator ID information, the paging agent/serving base station may send a key request (AK_Request) message directly to the ASN_GW where the anchor authenticator is located, requesting the AK and AK context of the MS. The message carries MS ID and BS ID. After receiving the message, the anchor authenticator generates a new AK and AK context for the MS and sends the AK and AK context to the paging agent/serving base station via a key transfer(AK_Transfer) message. After verification, the paging agent/serving base station sends the location update request (LU_REQ) message to the relay paging controller. The message carries MS ID, BS ID, anchor paging controller ID and indication of the completion of verification. Then, the relay paging controller forwards the location update request to the anchor paging controller/location register. The anchor paging controller/location register logs the ID information of the relay paging controller where the MS is located, performs location update and deletes the context of the MS. The subsequent procedures are similar to 304 and its subsequent procedures of the second embodiment, which is omitted herein for clarity.

Embodiment Four

The present embodiment provides a network logout procedure initiated by the network side caused by the time-out of the location update. In MS IDLE mode, the anchor paging controller/location register may wait for a periodic location update of the MS. When the anchor paging controller/location register does not receive the location update request of the MS in a predetermined time period, the MS is deemed to be off the network and a network logout operation needs to be performed upon the MS. The process is as follows.

(1) The anchor paging controller/location register waits for the location update of the MS until a timer times out. The anchor paging controller, including its associated location register, may delete the context of the MS it preserved and all parameters preserved for the MS in IDLE mode.

(2) The anchor paging controller transmits the MS Information Request (MS Info Request) message to the anchor data path function entity/FA. The MS Info Request message carries indication of MS logout. After receiving this message, the anchor data path function entity/FA will delete all the preserved context of the MS and, at the meantime, make a reply of the MS Information Response (MS Info Response) message to the anchor paging controller, indicating a deletion success.

(3) The anchor data path function entity/FA sends a Delete MS Context Indication message carrying the MS ID and informs the anchor service flow authorization (anchor SFA) function entity and anchor authenticator to which the MS corresponds. The anchor SFA and the anchor authenticator delete all the context associated with the MS.

Further, the anchor authenticator may also inform the anchor accounting client of the MS to stop accounting for the MS and inform the MA server of the MS logout information. The AAA server performs network logout upon the MS and deletes the context associated with the MS.

The anchor flow authorizer of the MS may further inform a policy server of the MS logout and may carry information such as MS ID, logout indicator, and/or logout reason.

The policy server deletes the context of the MS it maintains according to the received notification message, and may, at the same time, log the reason for network logout.

If the AAA server preserves the AK context of the MS, the MS anchor authenticator may further inform the MA server of the MS logout and may carry one of MS ID, logout indicator, the reason for logout or any combination thereof.

The MA server deletes the context of the MS it maintains according to the received notification message, and may, at the same time, log the reasons for network logout.

(4) For a proxy mobile IP (PMIP) MS, the FA further informs the Anchor PMIP Client to initiate a de-registration procedure for MIP.

For client mobile IP (CMIP), since the client of the MIP is on the MS and there is no data path which may carry MIP registration signaling between the MS and FA at present, the FA may send a Registration Revocation message to the HA to perform MIP de-registration procedure. Meanwhile, the HA responds to the Registration Revocation message to the FA to complete the MIP de-registration procedure.

The de-registration procedure for PMIP may also be similar to that for CMIP.

(5) IP address allocation entity releases the IP address of the MS.

For a dynamically allocated IP address, FA may, at the same time, inform the dynamic host configuration protocol (DHCP) proxy to initiate a procedure for releasing IP address. DHCP proxy sends a DHCP Release Request message to the DHCP server for releasing the dynamic IP address.

With respect to the approach of assigning IP address in the authentication procedure, IP addresses may be released during the exchanges between the anchor authenticator and the AAA server when the MS is logging out the network; alternatively, with respect to the approach of acquiring IP addresses during MIP registration procedure, the IP addresses may be released during MIP de-registration procedure when the MS is logging out the network.

So far, the network logout procedure is done. Since the network logout is caused by the fact that the network has not received the location update message of the MS, the network regards the MS as being off network. Therefore, the network would not inform (also not be able to inform) the MS of performing logout operation.

Embodiment Five

The present embodiment provides a network logout procedure for MS in IDLE mode as a result of resource congestion of the network side or service policy change, etc.

The resource congestion of the network side may occur in a physical entity where the foreign agent is located or in a physical entity where the service flow authorization management entity (anchor SFA) is located, or a physical entity where the home agent is located.

Since the MS, when in the IDLE mode, may occupy some resources, such as the link of R3 interface, IP address, resources of the FA. When these resources are in congestion (short of resources), the network side would consider to release the resources occupied by the MS that are inactive for a long time or that are of low priority so that the resources can be used by those users who need them. Meanwhile, the network side would initiate an MS logout procedure and inform the MS that the network is not available temporarily.

Specifically, the procedure are as follows.

(1) The congested function entities (such as FA, DHCP, anchor data path to which the MS corresponds) sends an MS Info REQ message which carries information such as MS ID, indication requiring the MS to logout the network and reasons for logout. (If the DHCP, anchor data path function entity does not know the anchor paging controller/location register to which the MS corresponds, the congested function entity may send message to the FA which will forward the message.)

(2) After receiving this message, the anchor paging controller/location register initiates paging to the MS with normal paging procedure. A paging message carries the purpose of requiring the MS to log out the network and may contain below information: time indicator or time and range indicator, requiring the MS not to access the current network in a prescribed time period or not to access the network in a prescribed range and in a prescribed time period. Such range may include the current base station, or the current paging group or other range. Alternatively, the MS may be instructed to connect to other network which can be a WiMAX network or other types of network. In addition, the anchor paging controller, including its associated location register, may delete the context of the MS it preserved and all parameters preserved for the MS in IDLE mode. Since the MS may not be responsive to the paging message of such reason, the BS, relay paging controller, anchor paging controller may not perform other processings (e.g., do not start timer or feed back the success or failure of the paging) after transmitting multiple paging broadcasting messages at air interface.

(3) The anchor paging controller sends the MS Information Request (MS Info Request) message to the anchor data path function entity and foreign agent (FA). The MS Info Request message carries indication of MS logout. After receiving this message, the anchor data path function entity and FA will delete all the maintained context of the MS and, at the meantime, make a reply of the MS Information Response (MS Info Response) message to the anchor paging controller, indicating the completion of deletion.

(4) At the same time, the FA transmits a Delete MS Context Indication message carrying the MS ID and informs the anchor service flow authorization (Anchor SFA) function entity and anchor authenticator to which the MS corresponds. The Anchor SFA and the anchor authenticator delete all the context associated with the MS.

(5) Further, the anchor authenticator may also inform the anchor accounting client of the MS to stop accounting for the MS and inform the MA server to acquire the information of MS logout. The AAA server performs network logout upon the MS and deletes the MS related context.

(6) For a proxy mobile IP (PMIP) MS, the FA may, at the same time, inform the Anchor PMIP Client to initiate a MIP de-registration procedure. For client mobile IP (CMIP), since the client of the MIP is on the MS and there is no data path which may carry MIP registration signaling between the MS and FA at present, the FA may transmit a Registration Revocation message to the HA for performing MIP de-registration procedure. Meanwhile, the HA responds to the Registration Revocation message to the FA to complete the MIP de-registration procedure.

The de-registration procedure for PMIP may also be similar to that for CMIP.

For a dynamically allocated IP address, the FA may, at the same time, informs a dynamic host configuration protocol (DHCP) proxy to initiate a procedure for releasing IP address. The DHCP proxy sends a DHCP Release Request message to the DHCP server. Alternatively, the anchor paging controller/location register may inform the DHCP proxy to transmit the DHCP Release Request to the DHCP server. Since there are various approaches for allocating the IP addresses, different allocation approaches differs in releasing the IP address. Therefore, in the process of MS logout, the procedure to be performed for releasing IP address may also vary with the allocation approach. For instance, with respect to the approach of assigning IP address in the authentication procedure, IP addresses may be released during the exchanges between the authenticator and the AAA server when the MS is logging out the network; alternatively, with respect to the approach of acquiring IP addresses during MIP registration procedure, the IP addresses may be released during MIP de-registration procedure when the MS is logging out the network.

(7) After the MS receives the paging message, it does not make any response, and directly performs logout operation and deletes information associated with the session and transaction flow. If the paging message carries a time indicator or time and range indicator, the MS may not be allowed to access the current network in a prescribed time period or not to access the network in a prescribed range and in a prescribed time period. If the message carries indicator that instructs the MS to access other networks, the MS may initiate an attempt to access the indicated network according to the capability of its own. After the MS completes the logout procedure, the MS may not initiate operations such as location update and paging message listening, but may receive network information and re-access the network once conditions are met. After the MS completes logout operation, it may attempt to access into other WiMAX network or non-WiMAX network to obtain services on its own initiative according to the capability of its own.

The changes of the network side may be caused by the operator's policy configuration which the AAA server is based on. The policy configuration includes performing logout operation when a subscriber owes the service charge, or the owner of the MS requests to stop receiving all the services on his initiative (specifically, for example, the MS may annul the user license due to loss of cell phone) or the operator requires the MS to log out the network.

When the network side varies with the service policy, the AAA server may initiates a logout request by carrying the indication of MS logout in the accounting message transmitted to the Anchor Accounting Client of the MS. The accounting message may further carry information such as MS ID and/or logout reasons. After the Anchor Accounting Client of the MS receives the message, it informs the anchor paging controller of the MS. Subsequent procedures, e.g., process (2) above and its subsequent processes of the embodiment, are executed by the anchor paging controller.

Considering another scenario, the AAA server may also initiate a logout request by carrying the indication of MS logout in the authentication message transmitted to the anchor authenticator of the MS. The authentication message may also carry information such as MS ID and/or logout reasons. After the Anchor Accounting Client of the MS receives the message, it informs the anchor paging controller of the MS. Subsequent procedures, e.g., process (2) and its subsequent processes of this embodiment, are executed by the anchor paging controller. In addition, in the logout procedure, a compulsory logout procedure may be conducted without informing the MS.

Embodiment Six

Figure 5:
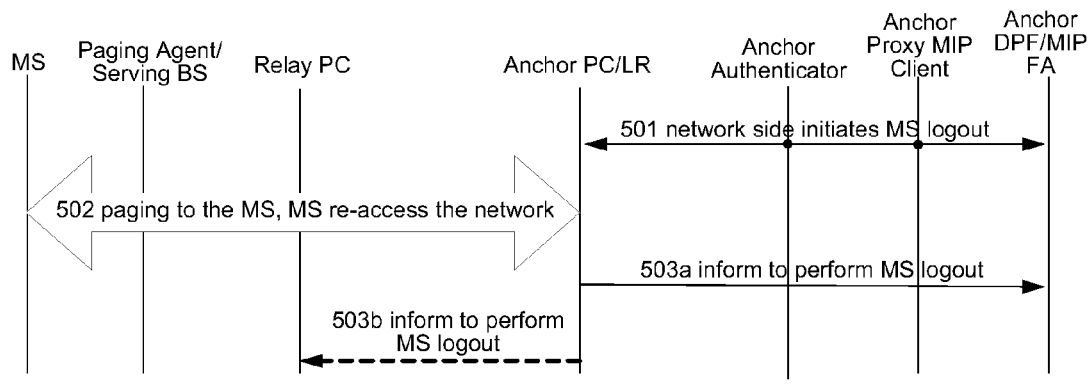
FIG. 5 is flowchart of MS logout according to a sixth embodiment.

The network side initiates an MS logout procedure. The anchor paging controller/location register initiates a paging procedure to the MS. The MS enters an ACTIVE state from the IDLE state. The network may then perform MS logout by employing a logout method with regard to ACTIVE state. As illustrated in FIG. 5, the process includes following processes.

At 501, the network side entity triggers logout operation and informs the anchor paging controller/location register to perform logout operation upon the MS in IDLE mode.

At 502, the anchor paging controller/location register initiates a paging procedure to the MS, requiring the MS to re-connect to the network. The MS responds to the paging message and initiates the re-access operation to enter into the ACTIVE state.

At 503, after the anchor paging controller/location register are informed that the MS has entered the ACTIVE state, it initiates an MS logout procedure. The anchor paging controller/location register herein may have one of the following options.

Process 503a: the anchor paging controller/location register sends a message to the anchor data path entity/FA to inform the anchor data path entity/FA to perform logout operation upon the MS.

Process 503b: the anchor paging controller/location register send a message to ASN_GW of the MS, informing the ASN_GW to perform logout operation upon the MS. If the anchor paging controller/location register and the ASN_GW are located on the same physical entity, the anchor paging controller/location register directly sends the message to the BS of the MS, informing the BS to perform logout operation upon the MS.

The anchor data path entity/FA, ASN_GW, or BS performs MS logout operation according to the logout procedure in the ACTIVE state.

Embodiment Seven

Figure 6:
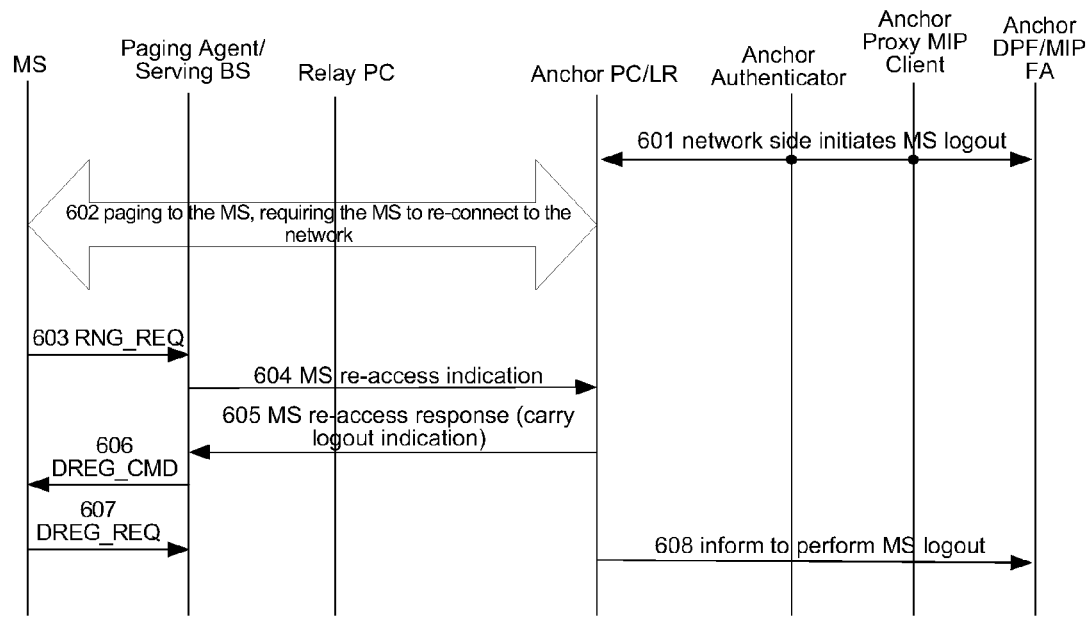
FIG. 6 is flowchart of MS logout according to a seventh embodiment.

The network side initiates a logout operation upon the MS. The anchor paging controller/location register initiates a paging procedure to the MS, requiring the MS to re-access the network from IDLE state. The network may then perform logout procedure upon the MS during the MS re-accessing procedure. As illustrated in FIG. 6, the procedure includes following steps.

At 601, the network side entity triggers logout operation and informs the anchor paging controller/location register to perform logout operation upon the MS in IDLE mode.

At 602, the anchor paging controller/location register initiates a paging procedure to the MS, requiring the MS to re-access the network.

At 603, the MS responds to a paging message and transmits a RNG_REQ message to the serving BS, and initiates a network re-access procedure.

At 604, the BS responds to the MS re-access and sends a message to inform the anchor paging controller/location register of the MS re-access procedure.

At 605, the anchor paging controller/location register makes a reply of a message to the BS. The message carries indication requiring the MS to logout the network.

At 606, after the BS received the indication, it sends a de-registration_command (DREG_CMD) message to request the MS to logout the network.

At 607, the MS responds to the logout message, deletes the associated context it saved and makes a reply of a de-registraion_request(DREG_REQ) message to the BS, indicating that the logout is completed.

At 608, the anchor paging controller transmits a message to the anchor data path (DPF) function entity/FA, indicating the anchor data path function entity/FA to perform logout operation upon the MS. The DPF/FA performs logout operation upon the MS according to the deletion and release of the MS related context by the network side with regard to the IDLE mode.

In the foregoing embodiments, the relay paging controller forwards messages between the serving base station and the anchor paging controller/location register. In the scenario where there is no relay paging controller node to pass through, the serving base station might also send messages directly to the anchor paging controller/location register via serving ASN_GW.

Overall, the methods for network logout for the MS in the IDLE mode provide location update procedures for MS in IDLE mode in various situations so that the location update procedure regarding the network side can be accomplished. The method further enables the paging controller or other network entities to delete the context of the MS and timely release resources that the network side configures for the MS after location update, and thus conserving the system resources.

The method according to the present disclosure includes, but not limited to, applications to the WiMAX system. It might also be applicable to other wireless access networks, for example, mobile network system evolved from 802.20, 3GPP LTE, 3GPP2 AIE, etc.

The foregoing embodiments are provided merely as illustrations, rather than limitations to the present disclosure. Any modification, equivalents, improvements, etc., made within the spirit and principle of the present disclosure shall be construed as within the scope of protection of the present disclosure.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method for a network side to logout a mobile station (MS) in an idle mode, wherein said network side comprising one or more network side entities, the method comprising:
when it is determined that a service policy of the network side changed, that the MS powered off, that the location update of the network side timed out, or that the resources of the network side are in congestion, sending, by an Authentication Authorization Accounting (AAA) server of the network side entities, an authentication message carrying a first indication of network logout to an anchor authenticator of the network side entities;
after receiving the authentication message, sending, by the anchor authenticator, a message for performing a network logout operation for the MS to an anchor paging controller/location register of the network side entities; and
receiving, by the anchor paging controller/location register, the message for performing the network logout operation for the MS from the anchor authenticator,
wherein according to the message for performing the network logout operation for the MS, the anchor paging controller/location register triggers at least one network side entity of the network side entities to release resources associated with the MS and delete a context of the MS stored in the at least one network side entity.

2. The method of claim 1, wherein the method further comprises:
deleting, by the at least one network side entity, the context of the MS stored in the at least one network side entity; and
performing, by the at least one network side entity, a mobile IP de-registration procedure for the MS.

3. The method of claim 1, wherein the AAA server preserves an authentication key context of the MS, and the method further comprises:
sending, by the anchor authenticator, the AAA server a second indication of network logout; and
deleting, by the AAA server, the preserved authentication key context of the MS according to the second indication.

4. The method of claim 1, wherein the triggering the at least one network side entity of the network side entities to release resources associated with the MS and delete the context of the MS stored in the at least one network side entity comprises:
sending, by the anchor paging controller/location register, a third indication of network logout, to an anchor data path function entity/mobile IP foreign agent function entity of the at least one network side entity.

5. The method of claim 4, wherein the method further comprises:

initiating, by the anchor data path function entity/foreign agent function entity of the at least one network side entity, a mobile IP de-registration operation upon the MS and deleting a context of the MS stored in the anchor data path function entity/foreign agent function entity.

6. The method of claim 4, wherein the at least one network side entity comprises the anchor authenticator, and the triggering the at least one network side entity of the network side entities to release resources associated with the MS and delete the context of the MS comprises:

sending, by the anchor data path function entity/mobile IP foreign agent function entity, an instruction to the anchor authenticator for deleting a context of the MS stored in the anchor authenticator.

7. The method of claim 6, wherein the triggering the at least one network side entity of the network side entities to releases resources associated with the MS and delete the context of the MS comprises:

triggering, by the anchor authenticator, an anchor accounting client to send an accounting termination message to the AAA server; and deleting, by the AAA server, a context of the MS stored in the AAA server.

8. The method of claim 1, wherein the at least one network side entity comprises the anchor paging controller/location register, the triggering the at least one network side entity of the network side entities to releases resources associated with the MS and delete the context of the MS comprises:

deleting, by the anchor paging controller/location register, a context of the MS stored in the anchor paging controller/location register.

9. The method of claim 1, wherein after receiving the message for performing the network logout operation for the MS from the anchor authenticator, the method further comprises:

sending, by the anchor paging controller/location register, a paging message to the MS, wherein the paging message carries a fourth indication of network logout;

wherein the MS logs out the network according to the fourth indication.

10. A system for a network side to logout a mobile station (MS) in an idle mode, comprising one or more network side entities serving the MS, where said one or more network side entities include an Authentication Authorization Accounting (AAA) server, an anchor authenticator and an anchor paging controller/location register; and wherein the Authentication Authorization Accounting (AAA) server is configured to send an authentication message carrying a first indication of network logout to the anchor authenticator, when it is determined that a service policy of the network side changed, that the MS powered off, that the location update of the network side timed out, or that the resources of the network side are in congestion;

the anchor authenticator is configured to receives the authentication message, and send a message for performing a network logout operation for the MS to the anchor paging controller/location register according to the authentication message; and the anchor paging controller/location register is configured to receive the message for performing the network logout operation for the MS, and trigger at least one network side entity of the network side entities to release resources associated with the MS and delete a context of the MS stored in the at least one network side entity, according to the message for performing the network logout operation for the MS.

11. The system of claim 10, wherein the AAA server preserves an authentication key context of the MS, and wherein the anchor authenticator is further configured to send the AAA server a second indication of network logout; and wherein the AAA server is further configured to delete the preserved authentication key context of the MS according to the second indication.

12. The system of claim 10, wherein the system further comprises an anchor data path function entity/mobile IP foreign agent function entity, and wherein the anchor paging controller/location register is further configured to send a third indication of network logout, to the anchor data path function entity/mobile IP foreign agent function entity.

13. The system of claim 12, wherein the anchor data path function entity/foreign agent function entity is further configured to initiate a mobile IP de-registration operation upon the MS and delete a context of the MS stored in the anchor data path function entity/foreign agent function entity, after receiving the third indication.

14. The system of claim 12, wherein the anchor data path function entity/mobile IP foreign agent function entity is further configured to send an instruction to the anchor authenticator for deleting a context of the MS stored in the anchor authenticator.

15. The system of claim 14, further comprising an anchor accounting client, wherein the anchor authenticator is further configured to trigger the anchor accounting client to send an accounting termination message to the AAA server; and wherein the AAA server is further configured to delete a context of the MS stored in the AAA server.

16. The system of claim 10, wherein the anchor paging controller/location register is further configured to delete a context of the MS stored in the anchor paging controller/location register, after receiving the message for performing the network logout operation for the MS from the anchor authenticator.

17. The system of claim 10, wherein the system further comprises the MS, wherein the anchor paging controller/location register is configured to send a paging message to the MS, after receiving the message for performing the network logout operation for the MS from the anchor authenticator, wherein the paging message carries a fourth indication of network logout; and wherein the MS is further configured to log out the network according to the fourth indication.

* * * * *